US007934367B2

(12) United States Patent
Mons

(10) Patent No.: US 7,934,367 B2
(45) Date of Patent: May 3, 2011

(54) METHOD AND DEVICE FOR REDUCING THE SPEED IN THE EVENT OF BREAKAGE OF A GAS TURBINE ENGINE TURBINE SHAFT

(75) Inventor: Claude Marcel Mons, Savigny le Temple (FR)

(73) Assignee: SNECMA, Paris (FR)

( * ) Notice: Subject to any disclaimer, the term of this patent is extended or adjusted under 35 U.S.C. 154(b) by 763 days.

(21) Appl. No.: 11/875,180

(22) Filed: Oct. 19, 2007

(65) Prior Publication Data

US 2008/0178603 A1 Jul. 31, 2008

(30) Foreign Application Priority Data

Oct. 25, 2006 (FR) ...................................... 06 54537

(51) Int. Cl.
*F02G 3/00* (2006.01)
(52) U.S. Cl. .................. 60/39.091; 60/39.281
(58) Field of Classification Search ............... 60/39.091, 60/39.281, 39.282, 734, 779, 790; 415/16
See application file for complete search history.

(56) References Cited

U.S. PATENT DOCUMENTS

| | | | | |
|---|---|---|---|---|
| 4,595,298 A * | 6/1986 | Frederick | ...................... | 374/144 |
| 4,982,126 A * | 1/1991 | Jolivet et al. | .................... | 310/90 |
| 6,923,048 B2 * | 8/2005 | Willsch et al. | ............. | 73/112.01 |
| 7,002,172 B2 * | 2/2006 | Rensch | ..................... | 250/559.45 |
| 7,100,354 B2 * | 9/2006 | Opper | ......................... | 60/39.091 |
| 7,735,310 B2 * | 6/2010 | Metscher | .................... | 60/39.091 |
| 2003/0091430 A1 * | 5/2003 | Mulera et al. | .................... | 415/14 |
| 2007/0056624 A1 * | 3/2007 | Gregory et al. | ............... | 136/238 |
| 2007/0231122 A1 * | 10/2007 | Tsuru et al. | .................... | 415/115 |
| 2009/0220333 A1 * | 9/2009 | Bilson et al. | .................. | 415/118 |

FOREIGN PATENT DOCUMENTS

| | | |
|---|---|---|
| EP | 0 374 003 | 6/1990 |
| EP | 1 455 054 A1 | 9/2004 |
| GB | 877127 | 9/1961 |

* cited by examiner

*Primary Examiner* — William H Rodríguez
*Assistant Examiner* — Phutthiwat Wongwian
(74) *Attorney, Agent, or Firm* — Oblon, Spivak, McClelland, Maier & Neustadt, L.L.P.

(57) ABSTRACT

A device for detecting breakage of a gas turbine engine shaft and for reducing the rotational speed of the turbine includes a rotor of a turbine or of a first stage turbine driving the shaft. The rotor has a turbine disk with a rim. A stator that the rotor rotates inside or a nozzle guide vanes assembly of the first turbine stage is provided. A temperature sensor is positioned on the stator or on the nozzle guide vanes assembly, immediately downstream of the rim. The sensor is located to sense temperature on a portion of the stator that contacts the rotor, or on a portion of the nozzle guide vanes assembly that contacts the first stage rotor, in the event of shaft breakage. An engine fuel control member connects to the sensor and can interrupt fuel supply to the engine, when the sensor emits a signal above a predetermined threshold.

20 Claims, 1 Drawing Sheet

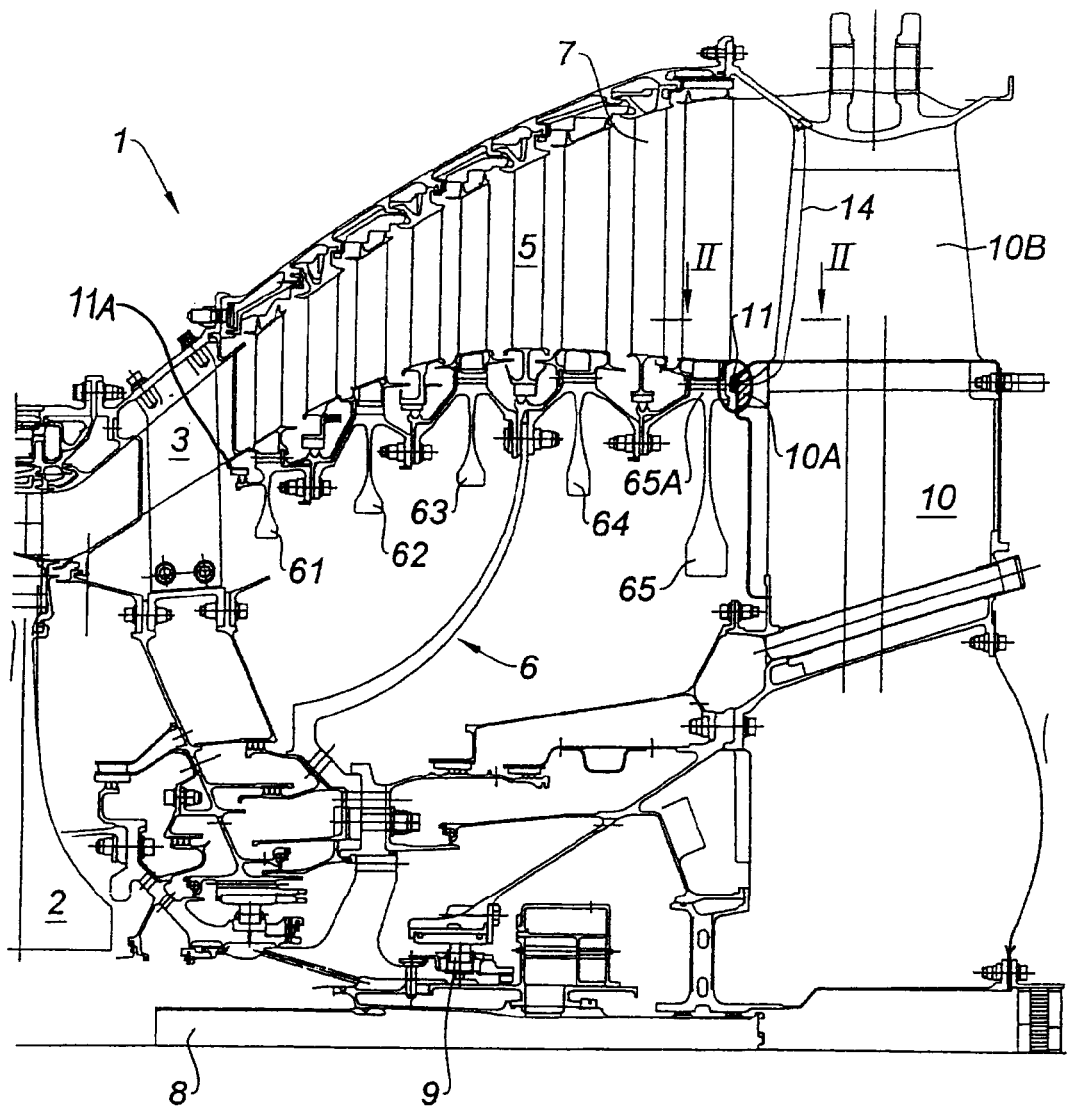
Fig. 1
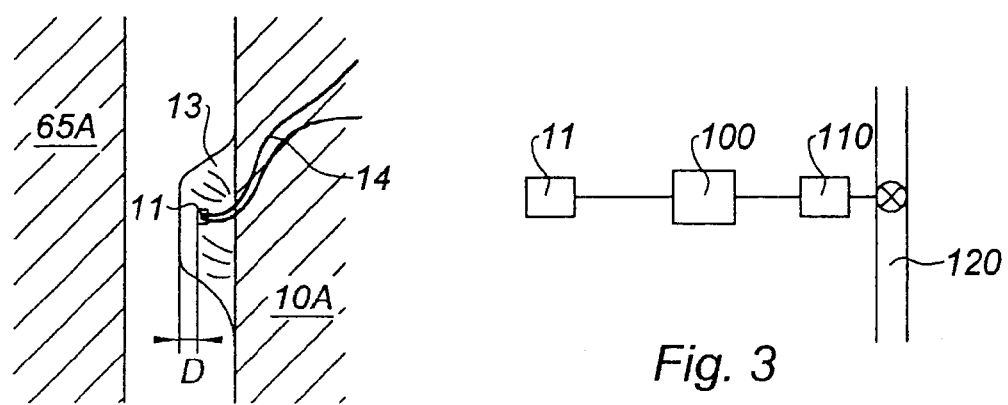
Fig. 2
Fig. 3

METHOD AND DEVICE FOR REDUCING THE SPEED IN THE EVENT OF BREAKAGE OF A GAS TURBINE ENGINE TURBINE SHAFT

BACKGROUND OF THE INVENTION

The present invention relates to the field of gas turbine engines, particularly multi-flow turbojet engines, and relates to a system able to detect breakage of a machine shaft so as to shut down the machine in the shortest possible space of time.

In a multi-spool multi-flow turbofan jet engine, the fan is driven by the low-pressure turbine. When the shaft connecting the fan rotor to the turbine rotor breaks, the mechanical load on the turbine is suddenly removed whereas the engine gas flow continues to transmit its energy to the rotor. This then results in a rapid increase in the rotational speed of the rotor which is liable to reach its yield stress and to explode with the ensuing catastrophic consequences.

DESCRIPTION OF THE PRIOR ART

Means for slowing the rotor when such an incident occurs have been proposed. The axial displacement of the rotor resulting from breakage of the shaft triggers the operation of mechanisms aimed at dissipating the kinetic energy thereof. These may, for example, involve fins of the adjacent nozzle guide vanes assembly which are pivoted toward the rotor blades in order to position themselves between these rotor blades and cut off their path. The kinetic energy is dissipated by the rubbing of parts against one another, the deformation or even the breakage thereof. This solution leads to significant repair costs because of the damage caused to the blading.

It has also been proposed that the arrival of fuel supplied to the combustion chamber be interrupted so as to eliminate the source of energy by which the rotor is accelerated. One solution is to monitor the rotational speed of the shafts using redundant measurement means and to interrupt the fuel supply when overspeed is detected. According to U.S. Pat. No. 6,494,046, the rotational frequencies are measured at the two ends of the shafts at the shaft bearings and are continuously compared in real time.

SUMMARY OF THE INVENTION

The present invention is aimed at a simple and effective method for reducing the rotational speed, in a gas turbine engine, of a turbine comprising a rotor driving a shaft and able to rotate inside a stator, in the event of breakage of said shaft.

The method is one which consists in measuring the temperature on a surface of the stator which surface lies downstream of the rotor, in transmitting the measurement signal to a control means that controls the slowing of the rotor, said control means being designed to control the slowing of the rotor when the temperature reaches a threshold. This slowing means is preferably the computer managing the control of fuel supplied to the engine combustion chamber. When the temperature reaches the defined threshold, the computer shuts down the fuel supply.

The rotor needs to move only a very short axial distance before it comes into contact with the stator and very quickly causes significant heating through friction. This is because the powers involved are high. Measuring the temperature is therefore a very effective indicator liable very quickly to reach a level characteristic of shaft breakage. Practically simultaneously shutting off the fuel supply makes it possible to avoid the onset of overspeed or, at the very least, to limit it by removing the main supply of energy to the turbine rotor. This measure leads to an increase in the bursting margin which may result in an increase in safety, a saving in mass, or alternatively a saving on the strength that the rotating parts need to have.

One advantageous means is to measure the temperature using a thermocouple sensor, at least one and preferably a plurality of thermocouple sensors distributed around the axis of the machine.

According to another feature, the temperature threshold is above the maximum temperature liable to be reached while the engine is running. This then avoids the risks of error due to reingurgitation of hot gases in particular.

The present invention also relates to a device for reducing the rotational speed, in a gas turbine engine, of a turbine comprising a rotor driving a shaft and able to rotate with respect to a stator, if said shaft breaks. This device is one which comprises a temperature sensor sensing the temperature on the stator and positioned near the rotor and connected to an engine fuel control member, said control member being designed to shut off the supply of fuel when the signal emitted by the sensor is above a determined threshold. The device may comprise one or a plurality of sensors and, with the turbine comprising a turbine disk with a rim, the sensor or sensors is or are positioned on the stator downstream of and in close proximity to the rim.

According to another feature, the sensor or sensors is or are thermocouple sensors and comprise a probe fixed to the stator by means of a ceramic or metallic coating. This measure allows the thermocouple probe to be positioned a short distance from the adjacent rotor while at the same time protecting it during normal running so that contact between the rotor and the stator leads to rapid heating of the thermocouple probe so that swift action can be taken with regard to the fuel supply.

BRIEF DESCRIPTION OF THE DRAWINGS

Other features and advantages will become apparent from the description of one nonlimiting embodiment of the invention, with reference to the drawings in which:

FIG. 1 shows an axial cross section of a turbine of a twin spool gas turbine engine incorporating the device of the invention, and shows a position of the device on the stator and a position of the device under the nozzle guide vanes assembly of the first turbine stage;

FIG. 2 shows a section on II-II of FIG. 1, in line with the temperature sensor; and FIG. 3 shows a simplified diagram of the fuel control.

DESCRIPTION OF THE PREFERRED EMBODIMENT

FIG. 1 shows part of the cross section of a turbine 1 of a gas turbine engine. In a twin-spool bypass engine, the turbine section 1 comprises a high-pressure turbine 2 which receives the hot gases from the combustion chamber, not depicted here. The gases, having passed through the blading of the high-pressure turbine rotor 2 are directed through a fixed nozzle guide vanes assembly 3, onto the low-pressure turbine section 5. This section 5 is made up of a rotor 6 formed, here in the form of a drum, of a collection of several blisks 61 to 65, five of them in this example. The blades, which comprise an airfoil and a root are mounted, generally individually, at the periphery of the disks in housings formed on the rim. Fixed nozzle guide vanes assemblies 7 are inserted between the turbine stages, the purpose of each being to direct the gaseous flow appropriately with respect to the mobile blading downstream. This assembly forms the low-pressure turbine section 5. The turbine rotor 6 is mounted on a shaft 8 concentric with the high-pressure shaft, not depicted in the figure, which is extended axially toward the front of the engine where it is attached to the fan rotor. The rotary assembly is supported by appropriate bearings located in the front and rear parts of the engine.

FIG. 1 shows the shaft 8 supported by a bearing 9 in the structural casing, termed the exhaust casing 10. The exhaust casing is provided with attachment means for mounting to an aircraft.

When, while the engine is running, the shaft 8 accidentally breaks, the moving parts of the low-pressure turbine move backward, toward the right in the figure, because of the pressure exerted by the gases. Furthermore, they are accelerated rotationally because of the disappearance of their load combined with the tangential thrust that the hot gases continue to exert on the mobile blading on their way through the turbine, and they increase in diameter.

In order, according to the invention, to prevent turbine rotor runaway, the fuel control is influenced in such a way as to extinguish combustion. Without this addition of energy, the rotor speed quickly drops as a result of the friction caused by the contacts resulting from the axial and radial movements.

A temperature sensor 11, and preferably a plurality of sensors, is positioned on those parts of the stator in the turbine section which will very early-on come into contact with a moving part after the shaft has broken and following the ensuing axial or radial movement.

Advantageously, these sensors are positioned on the exhaust casing 10 and more particularly on the part 10A of the stator at a radial distance from the engine axis XX that corresponds to the distance of the rim 65A of the disk 65 from the last stage of the turbine. The sensors are positioned in the part 10A of the stator so as to be as close as possible to the surface facing the rim 65A. It is desirable for this distance to be short enough that the rotor can come mainly into contact with that part of the stator that incorporates the sensors. When the rotor is driven rearward, the rim 65A comes into contact with the stator 10A while continuing to turn. Friction causes heating and an increase in the temperature of the stator 10A. By suitably positioning the sensors 11, it is possible to ensure that they themselves experience a rise in temperature that lags behind the increase in temperature of the mutually contacting surfaces only by a very short space of time.

Another favorable position for a temperature sensor 11A is located under the nozzle guide vanes assembly of the first turbine stage, as depicted in FIG. 1.

Use is preferably made of thermocouple sensors. A thermocouple, as is known, comprises a hot junction that forms the probe in contact with the environment, the temperature of which is to be measured. This probe is connected by wires to a cold junction held at a reference temperature.

According to the embodiment depicted, the sensor probe 11 is embedded in a ceramic or metallic mass 13 bonded or fixed to the upstream flank of this part 10A of the stator 10 facing the rim of the disk 65A. The wires 14 of the thermocouple connecting the probe to the control member are guided through the cavity of a radial arm 10B of the exhaust casing 10 as far as the computer that controls the fuel supply to the combustion chamber. As depicted in FIG. 2, the probe with the hot junction is a distance D away from the surface of the attached ceramic or metallic mass which is as short as possible so as to respond quickly in the event of contact, given the fact that it needs to be protected from attack by the hot gases when the engine is running normally.

In FIG. 2, the mass 13, made of a ceramic such as one based on zirconia or alumina, or made of a metal such as an alloy based on NiCoAl or an alloy based on NiAl, may have been deposited using a plasma beam. The thickness of the deposit may for example be of the order of 2 to 4 mm. The probe 11 is thus embedded in the mass a distance D away which distance may be short, allowing it to heat up quickly.

FIG. 3 shows a schematic depiction of the chain of command. The probe produces a signal corresponding to the temperature measurement and sends it to the computer 100. This is, for example, the full authority digital electronic control which is the regulating member of the engine and which is known by its English-language acronym FADEC. It manages the control 110 of the fuel valve 111 on the line 120 supplying the gas turbine engine combustion chamber.

When the temperature measured exceeds a determined threshold value, the computer sends the instruction to close the fuel valve 111. The threshold is, for example, above the EGT (exhaust gas temperature) margin. This is the difference between the temperature at which the engine has to be run in order to obtain the desired thrust and the certified temperature.

The invention claimed is:

1. A device for detecting breakage of a shaft of a turbine in a gas turbine engine and for reducing the rotational speed of the turbine, comprising:
    a stator,
    a turbine rotor driving the shaft and rotating inside the stator, the turbine rotor including a turbine disk provided with a rim,
    a temperature sensor sensing a temperature on the stator, the temperature sensor positioned on the stator immediately downstream of the rim, the temperature sensor located to sense the temperature on a portion of the stator that contacts the rotor in the event of shaft breakage, and
    an engine fuel control member connected to the temperature sensor, the engine fuel control member interrupting fuel supply to the engine when the temperature sensor emits a signal that is above a predetermined threshold.

2. The device as claimed in claim 1, in which the temperature sensor is a thermocouple.

3. The device as claimed in claim 1, further comprising: a plurality of temperature sensors that are thermocouples.

4. The device as claimed in claim 2, further comprising: a thermocouple probe fixed to the stator by means of a coating.

5. The device as claimed in claim 3, further comprising a plurality of thermocouple probes fixed to the stator by means of a coating.

6. The device as claimed in claim 4, further comprising: thermocouple wires connecting the thermocouple probe to the engine fuel control member, the thermocouple wires guided through a cavity of a radial arm of an exhaust casing.

7. The device as claimed in claim 4, in which the coating is a mass, and the mass is a material selected from the group consisting of a ceramic based on zirconia, a ceramic based on alumina, an alloy based on NiCoAl, and an alloy based on NiAl.

8. The device as claimed in claim 7, in which the mass has a thickness of 2 to 4 mm.

9. The device as claimed in claim 1, in which the engine fuel control member is a full authority digital electronic control (FADEC).

10. The device as claimed in claim 1, in which the predetermined threshold is an exhaust gas temperature margin, defined as the difference between a temperature at which the engine has to be run in order to obtain a desired thrust and a certified temperature.

11. A device for detecting breakage of a shaft of a turbine in a gas turbine engine and for reducing the rotational speed of the turbine, comprising:
   a first turbine stage,
   a nozzle guide vanes assembly of the first turbine stage,
   a first stage turbine rotor driving the shaft, the first stage turbine rotor including a turbine disk provided with a rim,
   a temperature sensor sensing a temperature on the nozzle guide vanes assembly, the temperature sensor positioned on the nozzle guide vanes assembly immediately downstream of the rim, the temperature sensor located to sense the temperature on a portion of the nozzle guide vanes assembly that contacts the first stage turbine rotor in the event of shaft breakage, and
   an engine fuel control member connected to the temperature sensor, the engine fuel control member interrupting fuel supply to the engine when the temperature sensor emits a signal that is above a predetermined threshold.

12. The device as claimed in claim 11, in which the temperature sensor is a thermocouple.

13. The device as claimed in claim 11, further comprising:
   a plurality of temperature sensors that are thermocouples.

14. The device as claimed in claim 12, further comprising:
   a thermocouple probe fixed to the nozzle guide vanes assembly by means of a coating.

15. The device as claimed in claim 13, further comprising:
   a plurality of thermocouple probes fixed to the nozzle guide vanes assembly by means of a coating.

16. The device as claimed in claim 14, further comprising:
   thermocouple wires connecting the thermocouple probe to the engine fuel control member, the thermocouple wires guided through a cavity of a radial arm.

17. The device as claimed in claim 14, in which the coating is a material selected from the group consisting of a ceramic based on zirconia, a ceramic based on alumina, an alloy based on NiCoAl, and an alloy based on NiAl.

18. The device as claimed in claim 17, in which the material has a thickness of 2 to 4 mm.

19. The device as claimed in claim 11, in which the engine fuel control member is a full authority digital electronic control (FADEC).

20. The device as claimed in claim 11, in which the predetermined threshold is a gas temperature margin, defined as the difference between a temperature at which the engine has to be run in order to obtain a desired thrust and a certified temperature.

* * * * *